(12) United States Patent
Sammito et al.

(10) Patent No.: US 8,251,309 B2
(45) Date of Patent: Aug. 28, 2012

(54) THRUST FORCE TAKE-UP DEVICE FOR AN AIRCRAFT ENGINE PYLON ENGINE MOUNTING STRUCTURE, COMPRISING LATERAL LINK RODS WITH INTEGRAL SPREADER BAR STOPS

(75) Inventors: Laurent Sammito, Toulouse (FR); Michael Berjot, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 611 days.

(21) Appl. No.: 12/466,904

(22) Filed: May 15, 2009

(65) Prior Publication Data

US 2009/0294580 A1   Dec. 3, 2009

(30) Foreign Application Priority Data

May 29, 2008   (FR) ...................................... 08 53509

(51) Int. Cl.
   *B64D 27/26*   (2006.01)
(52) U.S. Cl. .......................................................... 244/54
(58) Field of Classification Search ................ 244/53 R, 244/54, 56
   See application file for complete search history.

(56) References Cited

U.S. PATENT DOCUMENTS

| 5,277,382 | A | * | 1/1994 | Seelen et al. | 244/54 |
| 5,620,154 | A | * | 4/1997 | Hey | 244/54 |
| 5,649,417 | A | * | 7/1997 | Hey | 60/797 |
| 5,860,623 | A | * | 1/1999 | Dunstan et al. | 244/54 |
| 6,059,227 | A | * | 5/2000 | Le Blaye et al. | 244/54 |
| 6,474,596 | B1 | * | 11/2002 | Cousin et al. | 244/54 |
| 6,682,015 | B2 | * | 1/2004 | Levert et al. | 244/54 |

FOREIGN PATENT DOCUMENTS

| EP | 0 805 108 A2 | 11/1997 |
| EP | 0 879 759 A2 | 11/1998 |
| FR | 2 887 850 A1 | 1/2007 |
| FR | 2 903 382 A1 | 1/2008 |

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

The invention relates to a device (9) for taking up thrust forces for an aircraft engine pylon, which includes safety means, associated with each of the two lateral link rods (90) for taking up forces and equipped with first end-stop means (108) fitted to the link rod, as well as second end-stop means (112) fitted to the spreader bar (91), where these end-stop means, once they have come into contact as a result of relative rotation between the spreader bar and the link rod around the axis (93) of a link rod pivot mechanism (92) and in a given direction of rotation, are used to stop the said relative rotation in the given direction of rotation.

17 Claims, 6 Drawing Sheets

THRUST FORCE TAKE-UP DEVICE FOR AN AIRCRAFT ENGINE PYLON ENGINE MOUNTING STRUCTURE, COMPRISING LATERAL LINK RODS WITH INTEGRAL SPREADER BAR STOPS

TECHNICAL FIELD

The present invention relates in general terms to an aircraft engine assembly, of the type made up of an engine, a pylon engine mounting structure, and an engine fitting system equipped with multiple engine attachment members and which is located between a rigid structure of the pylon and the engine.

The invention also relates to such an aircraft engine pylon.

The invention also relates to a device for taking up thrust forces designed to be incorporated into such a pylon.

The invention may be used on all types of aircraft fitted with, for example, turbojets or turbo-prop engines.

This type of pylon, also called an "EMS" ("Engine Mounting Structure"), is used, for example to suspend a turboshaft engine below an aircraft's wing, or to mount this turboshaft engine above the same wing.

THE STATE OF THE ART

A pylon engine mounting structure is in effect designed to form an interface connecting an engine such as a turbojet engine and an aircraft's wing. It allow the forces generated by its associated turbojet engine to be transferred to the structure of this aircraft and also provides routing for fuel, electrical, hydraulic and air systems between the engine and the aircraft.

In order to allow forces to be transmitted, the pylon is comprised of a rigid structure, also known as the "primary" structure, often of the rigid box-type, that is, formed of an assembly of upper and lower spar and two lateral panels connected together by means of transverse ribs.

In addition the structure is equipped with a system for fitting the engine, located between the turbojet engine and the rigid structure of the pylon, where this system overall includes at least two engine attachment members, usually a front attachment member and a rear attachment member.

In addition, the mounting system includes a device for taking up the thrust forces generated by the turbojet. In the existing technology, this device takes the form, for example, of two lateral link rods connected on the one hand to a rear part of the turbojet's fan casing and on the other hand to a spreader bar, itself mounted so that it pivots on an engine rear attachment member body fixed to the box structure. Alternatively, the spreader bar may be mounted so that it pivots on a support element which is separate from the rear engine attachment member body, for example, it may be arranged so that it is fixed onto the box structure, between the front and rear engine attachment members, on the lower spar.

Similarly the pylon also includes a second mounting system fitted between the rigid structure of this pylon and the aircraft's wing, where this second system is usually made up of two or three attachment members.

Finally, the pylon is equipped with a secondary structure which separates and holds the systems whilst supporting aerodynamic fairings.

In the construction options which use the existing technology, the device for taking up thrust forces is of a specific design which incorporates so-called "Fail-safe" safety/back-up functions, allowing forces to be transmitted to the wing even in the event of failure, which could, for example, take the form of a breakage of a lateral link rod or of a pivot mechanism acting as the link between one of the lateral link rods and the spreader bar, or even of a breakage of the pivot mechanism of the spreader bar with respect to the pylon box structure.

In order to provide these "Fail Safe" functions duplication of the links could be used. As an example, the pivot mechanism for the spreader bar takes the form of a system of shafts which combine two concentric mechanisms, one of which is a back-up, that is, it remains inoperative as long as the principal mechanism does not exhibit any defects. Alternatively, the two concentric shafts may operate together in normal mode.

As far as the lateral link rods which take up the thrust forces are concerned, their rear ends are often complicated by the incorporation of an additional link, the so-called back-up, into the attachment member body for the rear engine attachment member, as is known in particular from documents EP 1 136 355 and U.S. Pat. No. 6,494,403. These configurations not only involve complex design of the rear part of the engine mounting system, reflected as extended and therefore costly fitting and removal times, but also result in large overall dimensions, as well as an overall mass which is also noticeably detrimental.

Another solution for dealing with breakage of one of the two link rods which take up thrust forces involves fitting a system of symmetric end-stops on the rear engine attachment member body or the lower spar of the box structure, which restricts the rotation of the spreader bar which is now only connected by one of its two link rods. In this case the lateral end of the spreader bar carrying the defective link rod effectively comes into contact with the associated end stop, which prevents rotation of the spreader bar, which is still connected to the non-defective link rod at its opposite lateral end. Such a solution is known from document EP 0 805 108. It has the drawback of requiring significant overall dimensions, in particular as far as its spreader bar is concerned, whose lateral ends must be over-sized so that they can be brought as close as possible to their respective end-stops fitted to the rear engine attachment member body or the lower spar of the box section. Furthermore, the presence of the means of fixing that are a result of the end-stops causes further detrimental effects in terms of the overall mass and dimensions of the device for taking up thrust forces.

OBJECT OF THE INVENTION

The purpose of the invention is therefore to propose a solution which remedies, at least in part, the above mentioned disadvantages associated with construction options which use the existing technology. More specifically the purpose of the invention is to provide an improved design for the means used to restrict the rotation of the spreader bar, with these means being in particular designed to deal with a failure in one of the two lateral link rods of the device for taking up thrust forces.

In order to achieve this, the object of the invention is a device for taking up the thrust forces for an aircraft engine pylon, where the said device includes two lateral link rods for taking up thrust forces as well as a spreader bar which pivots through a spreader bar pivot mechanism fitted between two lateral ends of the said spreader bar on which the said two lateral links respectively pivot, each through a link rod pivot mechanism, where the said device also includes safety means which allow the rotation of the said spreader bar around the axis of the spreader bar pivot mechanism to be restricted.

According to the invention, the said safety means include, associated with each of the two lateral link rods, first end-stop means fitted to the said link rod, as well as second end-stop means fitted to the said spreader bar, where the said first and second end-stop means enable, once they have come into contact as a result of relative rotation between the spreader bar and the said link rod around the axis of the link rod pivot mechanism and in a given direction of rotation, the said relative rotation in the given direction of rotation to be stopped.

Thus in the normal mode for taking up thrust forces, the forces conventionally successively pass through the lateral link rods, the lateral ends of the spreader bar, the spreader bar pivot mechanism and then, finally, generally through a support component which is fixed relative to the rigid structure of the pylon, a component on which the spreader bar therefore pivots. In this normal mode the first and second end-stop means are preferably facing each other but at a distance from each other, preferably a small distance which is comparable with play.

One of the specific features of the invention lies in the path through which the forces pass in the event of a failure occurring in one of the two lateral link rods for taking up thrust forces. In effect, in the event of failure of a lateral link rod which takes the form, for example, of a breakage in this link rod, or breakage of a pivot mechanism which acts as the link between the lateral link rod and the spreader bar or between the same link rod and the engine casing, the other non-defective link rod, which continues to be placed under load by the engine exerts a force on the spreader bar which tends to make it pivot along the spreader bar pivot mechanism axis, with this pivoting being possible because of the relative rotation between the non-defective link rod and this spreader bar, along the axis of the link-rod pivot mechanism. For information, the direction of rotation of the spreader bar, as well as the direction of relative rotation between this spreader bar and the non-defective link rod depend on the mode of operation of the engine, whether it is in normal thrust mode or reverse-thrust mode.

The above mentioned movement caused by the force of the link rod on the spreader bar continues until the back-up link, which includes the end-stop means, is activated by the first and second end-stop means coming into contact. The end-stop means coming into contact then prevents the said relative rotation from continuing in the given direction. This advantageously plays a part in stopping the rotation of the spreader bar along the axis of the spreader bar pivot mechanism. The rotation of the spreader bar is in effect immobilised, since it is subjected to loads at three points by, respectively, the spreader bar pivot mechanism, the link rod pivot mechanism and finally by the end-stop means.

With this design, which forms part of the invention, the rear end of the lateral link rods no longer require the inclusion of an additional link to deal with possible breakage of the pivot mechanism with the associated lateral end of the spreader bar, given that in this last case the take up of forces is achieved in the original manner described above. Thus the design of the entire rear part of the engine mounting system may be simplified.

The design is also greatly simplified in relation to those previously encountered by the fact that the safety pathway for the thrust forces is effectively the same as the normal pathway, since only one additional contact between the link rod and the spreader bar has been added by means of the first and second end-stop means.

Preferably, the said safety means also include, associated with each of the two lateral link rods, third end-stop means fitted to the said link rod, as well as fourth end-stop means fitted to the said spreader bar, where the said third and fourth end-stop means enable the relative rotation in the opposite direction of rotation, once they have come into contact as a result of relative rotation between the spreader bar and the said link rod around the axis of the link rod pivot mechanism and in the direction of rotation opposite that of the given direction of rotation, to be stopped.

Consequently, with this configuration, it is possible to dedicate the first and second end-stop means to stopping the said relative rotation during a failure of one of the lateral link rods which occurs in one of the normal thrust modes or reverse thrust modes, and to dedicate the third and fourth end-stop means to stopping the relative rotation during the course of a failure in one of the lateral link rods which occurs in the other of the two aforementioned modes.

Preferably the first, second third and fourth end-stop means are designed in order to allow relative rotation between the spreader bar and the said link rod through an angular range of less than 10°. Still preferentially, it may be arranged so that the means are designed to allow the spreader bar to rotate along the axis of the spreader bar pivot mechanism, through an angular range of less than 10°.

Preferably, the rear end of each link rod has a housing which receives its associated lateral end of the spreader bar, with the said first and third end-stop means being respectively arranged on either side of the said housing in the longitudinal direction of the link rod. In order to reduce the overall dimensions further, it could be arranged that the link rod pivot mechanism passes through the said housing together with the lateral end of the spreader bar. However, an alternative solution would be foreseeable in which the link rod pivot mechanism is offset relative to the said housing so that it does not pass through the latter.

Preferably, the front end of each link rod is designed to pivot on the engine, with this specific feature being a preferred option to ensure that in addition to providing assistance in stopping the relative rotation between the link rod and the spreader bar, the rotation of the same spreader bar along the axis of the spreader bar pivot mechanism is stopped.

Preferably the said first, second, third and fourth end-stop means take the form of end-stop surfaces, preferably flat.

Another subject of the invention is an aircraft engine pylon which includes a device for taking up thrust forces as described above.

Preferably, the pylon includes an engine mounting system which incorporates the said device for taking up the thrust forces, and which additionally includes a rear engine attachment member which includes an attachment member body on which pivots at least one shackle designed to pivot on the engine, where the said attachment member body acts as a support element for the spreader bar pivot mechanism. However, an alternative would be to fit a support element which is separate from the rear engine attachment member body, preferably arranged so that it is fixed onto the box structure, between the front and rear engine attachment members.

Another subject of the invention is an engine assembly for an aircraft which includes a pylon such as that which has just been described, together with an engine fitted to this pylon.

Finally a subject of the invention is an aircraft which includes at least one such engine assembly.

Other advantages and characteristics of the invention will appear in the detailed non-restrictive description below.

BRIEF DESCRIPTION OF THE DRAWINGS

This description will be made in relation to the appended drawings, in which.

DETAILED DESCRIPTION OF PREFERRED EMBODIMENTS

Figure 1:
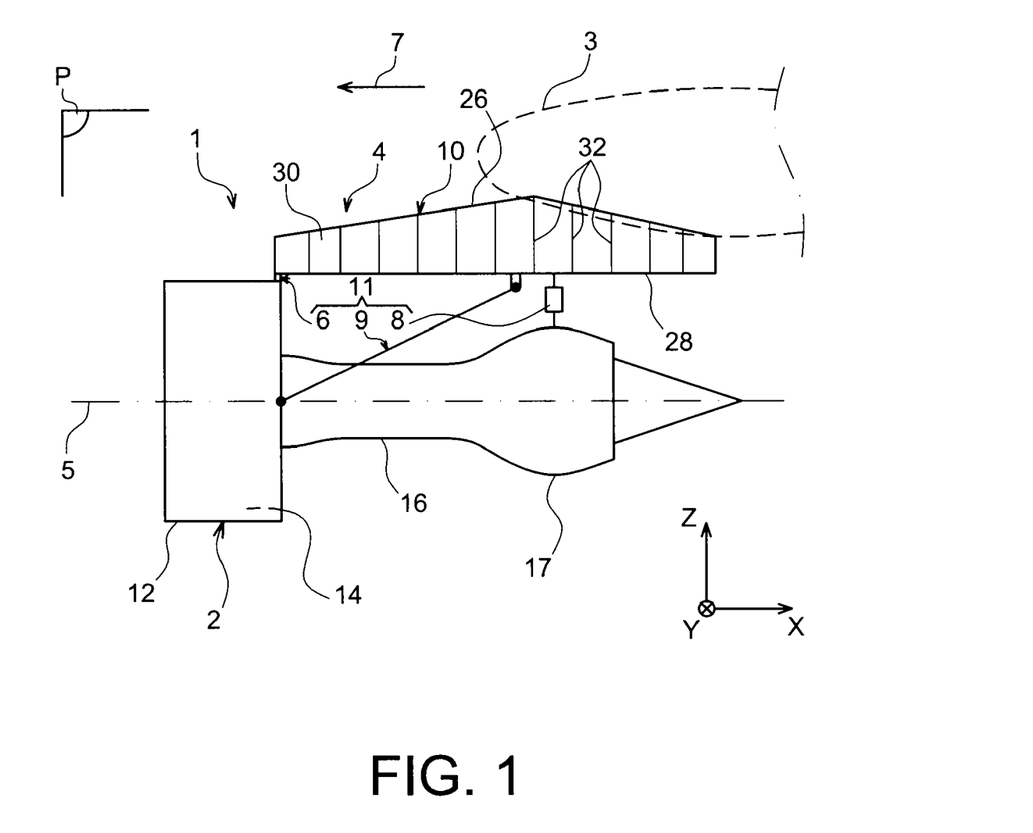
FIG. 1 represents a partially schematic side view of an engine assembly for an aircraft, which includes a pylon according to a preferred option for construction of the present invention.

With reference to FIG. 1, an aircraft engine assembly can be seen which is designed to be fixed beneath a wing 3 of this aircraft, where this assembly 1 which is the subject of the present invention being equipped with a pylon 4 in the form of a preferred construction option for the present invention.

Overall, the engine assembly 1 includes an engine such as a turbojet 2 and the pylon 4, where the latter is in particular equipped with a rigid structure 10 and a system for fitting the engine 11 made up of a number of engine attachment members 6, 8 and a device for taking up the thrust forces 9 generated by the turbojet 2, where the mounting system 11 is therefore fitted between the engine and the aforementioned rigid structure 10, where the latter is also called the primary structure. For information, it should be noted that the assembly 1 is designed to be surrounded by a nacelle (not shown) and that the pylon 4 includes another series of attachment members (not shown) which are used to suspend this assembly 1 beneath the aircraft's wings.

Throughout the description, by convention X is the name for the longitudinal direction of the pylon 4 which is also the same as the longitudinal direction of the turbojet 2, where this direction X is parallel to a longitudinal axis 5 of this turbojet 2. On the other hand, Y is the name given to the direction aligned in a transverse manner in relation to the pylon 4 and which is the same as the transverse direction of the turbojet 2, and Z is the vertical direction or height, where these three directions are orthogonal to each other.

In addition, the terms "front" and "rear" are to be considered in relation to the direction of forward motion of the aircraft encountered as a result of the thrust exerted by the engine 2, with this direction being schematically represented by the arrow 7.

In FIG. 1 one can see that only the take-up device 9, the engine attachment members 6, 8 and the rigid structure 10 of the pylon 4 have been represented. The other constituent elements of this pylon 4 that are not shown, such as the means of attachment of the rigid structure 10 beneath the aircraft's wings, or the secondary structure which separates and holds the systems whilst supporting the aerodynamic fairings, are conventional components which are identical or similar to those encountered in the existing technology, and known to those working in this field. There will consequently be no detailed description of these.

The turbojet 2 is equipped at its front with a fan casing 12 of large dimensions, which surround an annular fan case duct 14, and includes towards the rear a central casing 16 of small dimensions, which encloses the centre of this turbojet engine. Finally, the central casing 16 extends towards the rear through an ejector casing 17 with larger dimensions than those of the casing 16. The housings 12, 16 and 17 are, of course, firmly attached to each other.

As may be seen in FIG. 1, the system 11 is made up of a front engine attachment member 6, a rear engine attachment member 8, as well as an attachment member 9 which forms a device for taking up thrust forces generated by the turboshaft engine 2. As is shown schematically in FIG. 1, this device 9 takes the form of two lateral link rods (only one is visible because of the side view), connected on the one hand to a rear part of the fan casing 12, and on the other hand to a spreader bar which is mounted and pivots relative to the box structure 10, as described in detail below.

The front engine attachment member 6 is solidly attached to the fan casing 12 and is for example designed so that it can take up the forces generated by the turbojet 2 along directions Y and Z using shackles/connecting rods. For information, this front attachment member 6 preferably enters into a portion of the circumference extremity of the fan casing 12.

The rear engine attachment member 8 is in overall terms fitted between the ejector casing 17 and the rigid structure 10 of the pylon. This is in turn designed so that it can take up the forces generated by the turbojet 2 along the directions Y and Z, as well as those acting along direction X, as a result of its specific interaction with the thrust force take-up device 9, which will be described below.

Still with reference to FIG. 1, it can be seen that the structure 10 takes the form of a box structure extending along the direction X, and this box structure is also called the torsion box. It is conventionally formed from an upper spar 26 and a lower spar 28 together with two lateral panels 30 (with only one being visible in FIG. 1) which both extend along direction X and effectively in a plane XZ. Inside this box structure transverse ribs 32 arranged along planes YZ and spaced apart longitudinally reinforce the rigidity of the box structure. It should be noted for information that the components 26, 28 and 30 may each be constructed from a single piece, of by the assembly of attached sections, which may possibly be slightly inclined in relation to one another.

Figure 2:
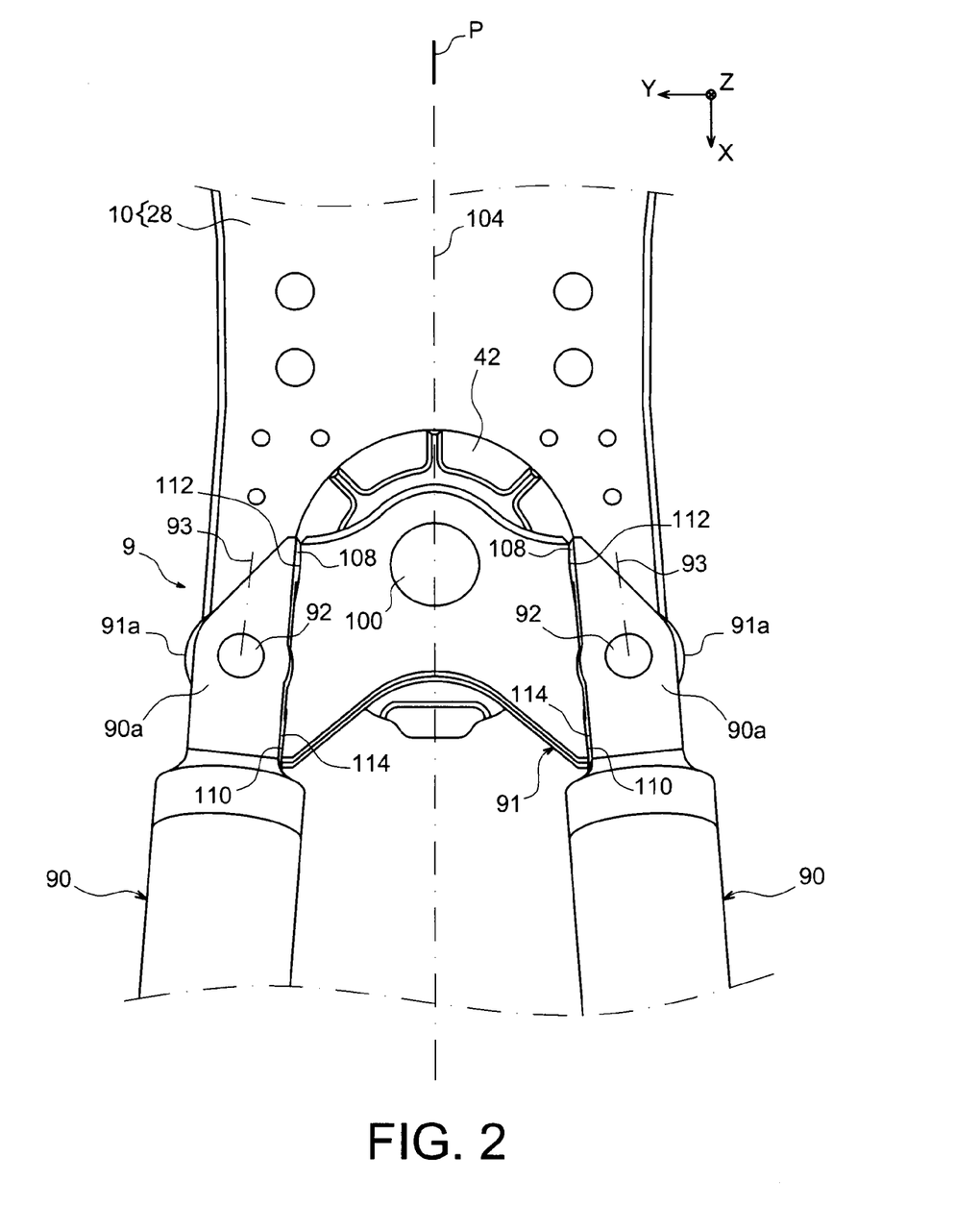
FIG. 2 shows a partial detailed view from below of the device for taking up thrust forces belonging to the pylon shown in FIG. 1.
Figure 3:
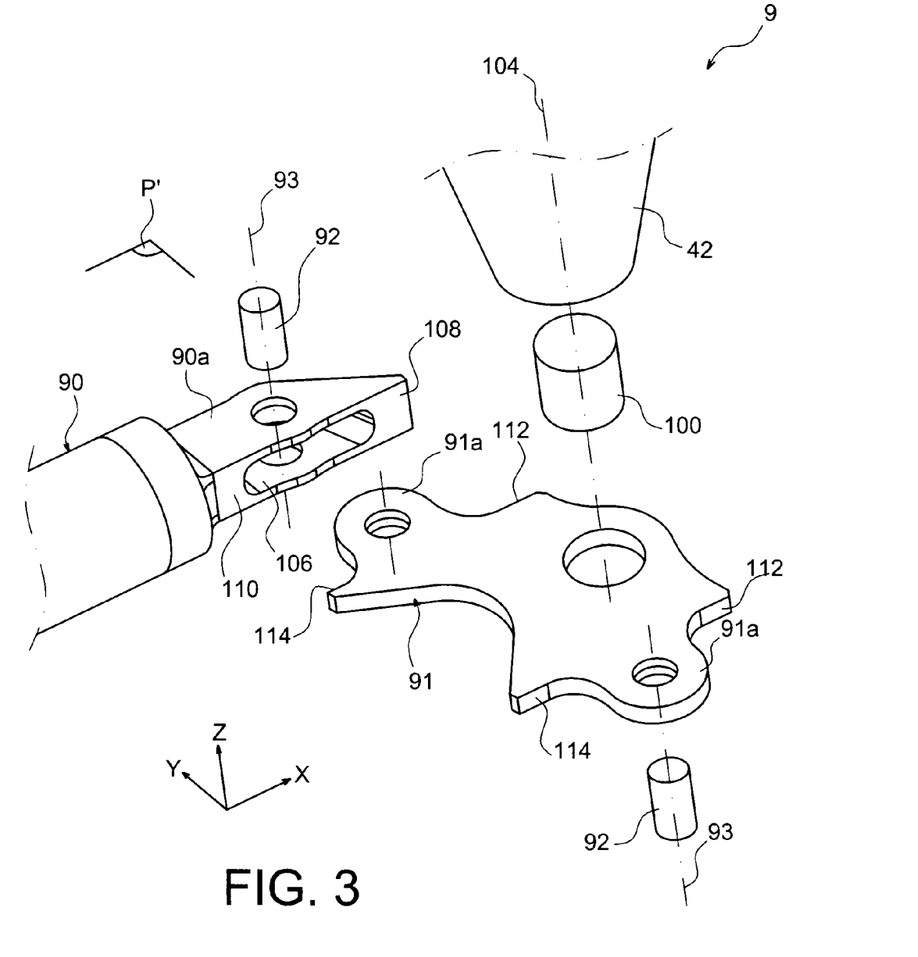
FIG. 3 shows a partially exploded perspective view of a part of the device for taking up thrust forces shown in FIG. 2.
Figure 4:
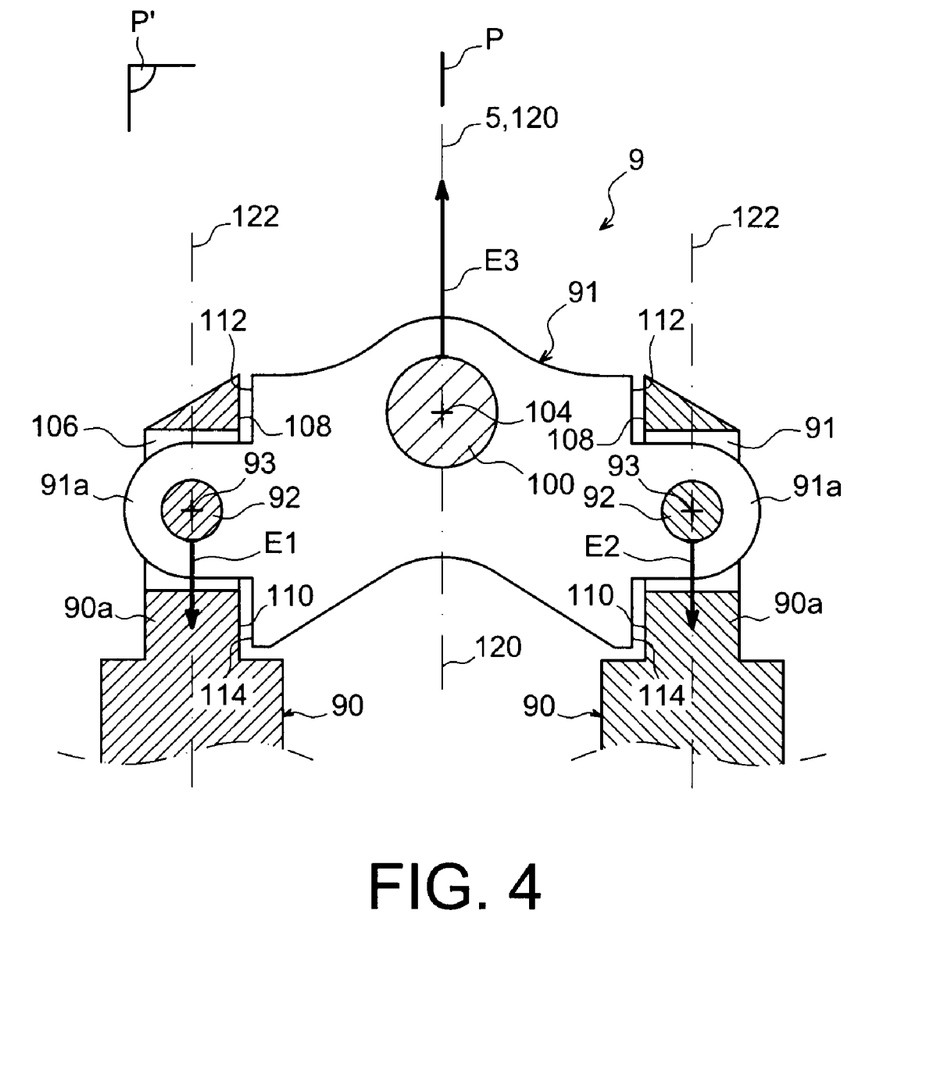
FIG. 4 shows a partial section view passing through the plane P' of the spreader bar in FIG. 3.

With reference to FIGS. 2 to 4, a part of the device 9 for taking up thrust forces can be seen, some parts of which have been deliberately omitted, obviously for the sake of clarity.

Overall the device 9 is made up of two lateral link rods which take up thrust forces 90, where each of these link rods includes a front end (not shown in these figures) connected, so that it pivots, to the fan casing 12, for example on or close to a horizontal median plane of the turboshaft engine 2. The two lateral link rods 90, arranged on either side of the plane P aligned along directions X and Z and which effectively forms a plane of symmetry for the pylon, each have a rear end 90a connected to a spreader bar 91.

The spreader bar 91 has two opposite lateral ends 91a, each of which is mounted so that it pivots on its associated rear link rod end 90a. A mechanical link which makes up the link through which thrust forces are designed to pass in normal mode, is constructed using a pivot mechanism 92 which connects the rear end 90a with the corresponding lateral end of the spreader bar 91a.

Preferably, the two mechanisms 92 respectively define two pivot axes for the link rod 93, also called the link rod rear end pivot axes. They are orthogonal in relation to the plane P' of the link rods 90, which also corresponds to the plane of the spreader bar, and are arranged, when viewed from below, on either side of a principal spreader bar pivot mechanism 100. For information, it should be noted that the plane P' is conventionally parallel to the direction Y, and inclined in relation to directions X and Z. In addition, the two axes 93 of the link rod pivot mechanisms 92 are parallel to each other and also parallel to the axes along which the front ends of the link rods pivot on the casing.

The mechanism 100, crossed through by the plane P, allows the spreader bar 91 to pivot on a body 42, fixed to the box structure 10, underneath the lower spar 28, by means, for example, of vertical bolts and vertical shear pins. The main mechanism 100 defines a principal spreader bar pivot axis 104 arranged in the plane P and which is parallel to the aforementioned axes 93.

This part of the device 9 is effectively of conventional design, insofar as in normal "non failure" operating mode it allows forces to pass successively through the link rods 90, the pivot mechanisms 92 preferably of the single mechanism type and therefore not duplicated, the spreader bar 91, the main pivot mechanism 100, preferably of the duplicated mechanism type, the attachment member body or fixed component 42, so that they are then introduced into the box structure 10 through the lower spar 28 and relevant transverse rib.

In a known manner, centering the principal mechanism 100 on the spreader bar 91 in direction Y means that the forces transmitted by each of the two lateral link rods 90 are balanced.

One of the specific features of the present invention lies in the design for the means used to restrict/prevent rotation of the spreader bar along the axis 104, where these means are in particular designed to deal with a failure in one of the two lateral link rods 90.

In effect, each link rod 90a front end has a housing 106 which preferably takes the form of a slot effectively aligned along the plane P', and which preferably passes completely through the link rod. On either side of this housing 106, in the longitudinal direction of the link rod, there are arranged, respectively, the first end-stop means as well as the third end-stop means. Each of these means takes the form of a surface, preferably a plane surface, aligned facing the plane of symmetry P. Thus the first end-stop means preferably correspond to a flat surface 108 located in the rear extension of the opening of the slot 106, whereas the third end-stop means preferably correspond to a flat surface 110 located in the front extension of this opening, with both surfaces 108, 110 aligned facing the plane P preferably being co-planar.

The housing 106 is designed to receive the associated lateral end of the spreader bar 91a. The connection between the two components via the mechanism 92 is such that the latter passes through each of the two sides which enclose the housing 106, and therefore also pass through this same housing as well as through the part of the end 91a located in the housing.

On either side of the part of the end 91a located in the housing 106, in the longitudinal direction, there are arranged, respectively, the second end-stop means as well as the fourth end-stop means. Each of these means takes the form of a surface, preferably flat, aligned laterally towards the pylon exterior. Thus the second end-stop means preferably correspond to a flat surface 112 located so as to face and in close proximity to the surface 108, whereas the fourth end-stop means preferably correspond to a plane surface 114 located facing and in close proximity to the surface 110, with both surfaces 112, 114, preferably being co-planar.

As long as no failure occurs in the link rods, the end-stop surfaces 108 and 112 remain separated by a small gap, both in normal thrust mode and in reverse-thrust mode. This is also true for the end-stop surfaces 110 and 114. Consequently there is force applied to the spreader bar 91 at three points only, by a force E1 from the pivot mechanism 92 of one of the two link rods 90 on its corresponding lateral spreader bar end 91a, by a force E2 from the pivot mechanism 92 of the other link rod 90 on its corresponding lateral side spreader bar end 91a, then by a force E3 from the pivot mechanism of the spreader bar 100 on a central part of the latter.

Figure 5A:
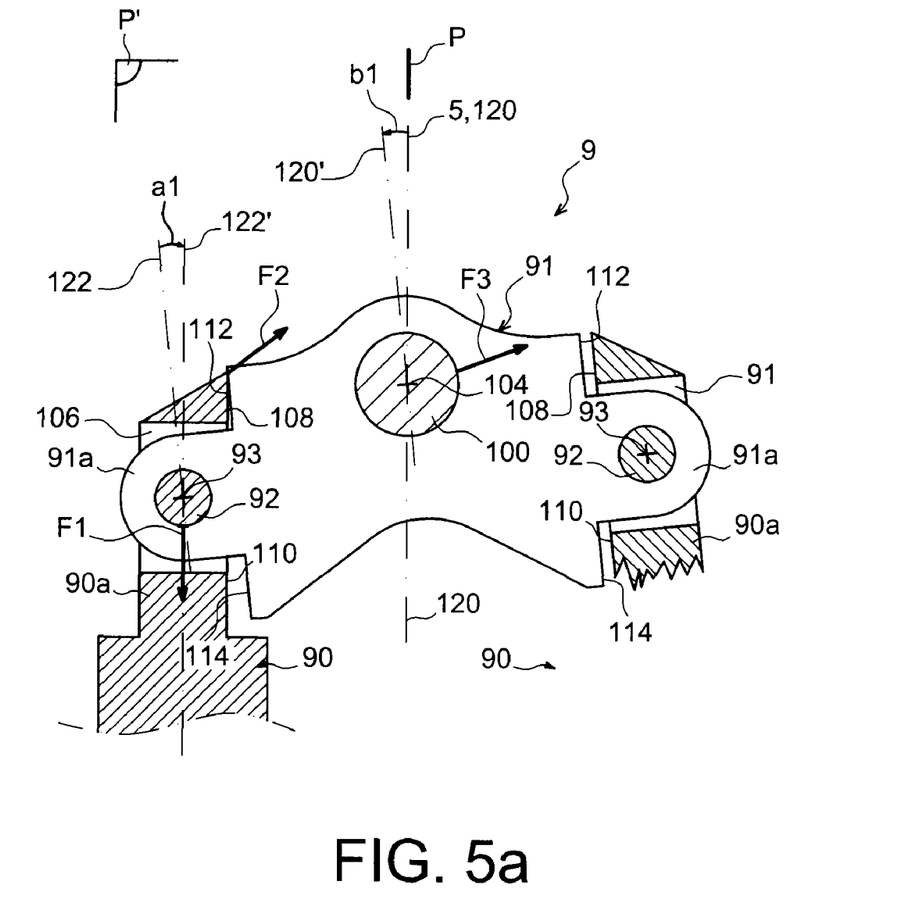
FIG. 5a shows a view which is similar to that of FIG. 4, in a configuration adopted following a failure of one of the two lateral link rods for taking up thrust forces, in normal thrust mode.

With reference now to FIG. 5a, one can see the take-up device 9 in failure mode, encountered after failure of a link rod, which takes the form, for example, of a breakage of this lateral link rod 90 or even breakage of its pivot mechanism 92. The breakage occurs, then, when the engine is operating in normal thrust mode.

When a failure of this type occurs, the spreader bar 91, which is now only connected by a single link rod 90, pivots until the back-up link which incorporates the end-stop means is activated, by taking up the gap between the surfaces 108 and 112, and these surfaces then coming into contact with each other.

More precisely, the non-defective link rod, that on the left in FIG. 5a, continues to have force applied to it by the engine, and exerts a force F1 on the lateral end of the spreader bar 91a, which tends to cause this spreader bar to pivot along axis 104 of the pivot mechanism 100. This pivoting is allowed by the relative rotation between the non-defective link rod 90 and the same spreader bar 91, along axis 93 of the pivot mechanism 92. The aforementioned movement resulting from the force F1 from the link rod on the spreader bar continues until the back-up link, which incorporates the end-stop means, is activated through the first and second end-stop surfaces 108, 112 coming into contact. This contact, shown in FIG. 5, then prevents relative rotation from continuing in the given direction, which corresponds here to a movement of the link rod relative to the spreader bar in the clockwise direction. The spreader bar in effect becomes immobilised in terms of rotation by having force exerted on it at three points, by the force F1 from the mechanism 92 on the lateral end of the spreader bar 91, by a F2 from the first end-stop surface 108 onto the second end-stop surface 112, then by a force F3 from the pivot mechanism of the spreader bar 100 on a central part of the latter.

Thus, in spite of the failure of one of the lateral links 90, the spreader bar 91 remains subjected to three balanced forces shown schematically by the arrows F1, F2 and F3 on FIG. 5a.

For the definition of the angular range of the rotation of the facing components, firstly a neutral position is defined which corresponds to that in FIG. 4, in which the spreader bar and its link rods have plane P as a plane of symmetry. In this position, an axis of symmetry 120 for the spreader bar 91 is located in the plane P, being the same as the axis 5 of the engine in the section view along plane P' of FIG. 4. In addition, each link rod 90 is aligned along a link rod axis 122, which exhibits an angular positioning which is defined relative to the lateral end of the spreader bar 91a.

Relative rotation of the link rod 90 relative to the spreader bar 91 occurs through an angle a1 between the neutral position and the end-stop position of FIG. 5a, in which the non-defective link rod 90 is then aligned along a link rod axis 122' relative to the lateral end of the spreader bar 91a. The angle a1 defined between these two axes 122, 122' is preferably less than 5°. Similarly the relative rotation of the spreader bar 91 relative to its fixed support component 42 occurs through an angle b1 between the neutral position and the end-stop position of FIG. 5a. In other terms, the axis of symmetry 120 of the spreader bar 91 in its neutral position is inclined at an angle b1 relative to the same axis of symmetry 122' of the spreader bar in its end-stop position against the non-defective link rod. Here also it is arranged so that the angle b1 defined between these two axes 120, 120' is preferably less than 5°.

Figure 5B:
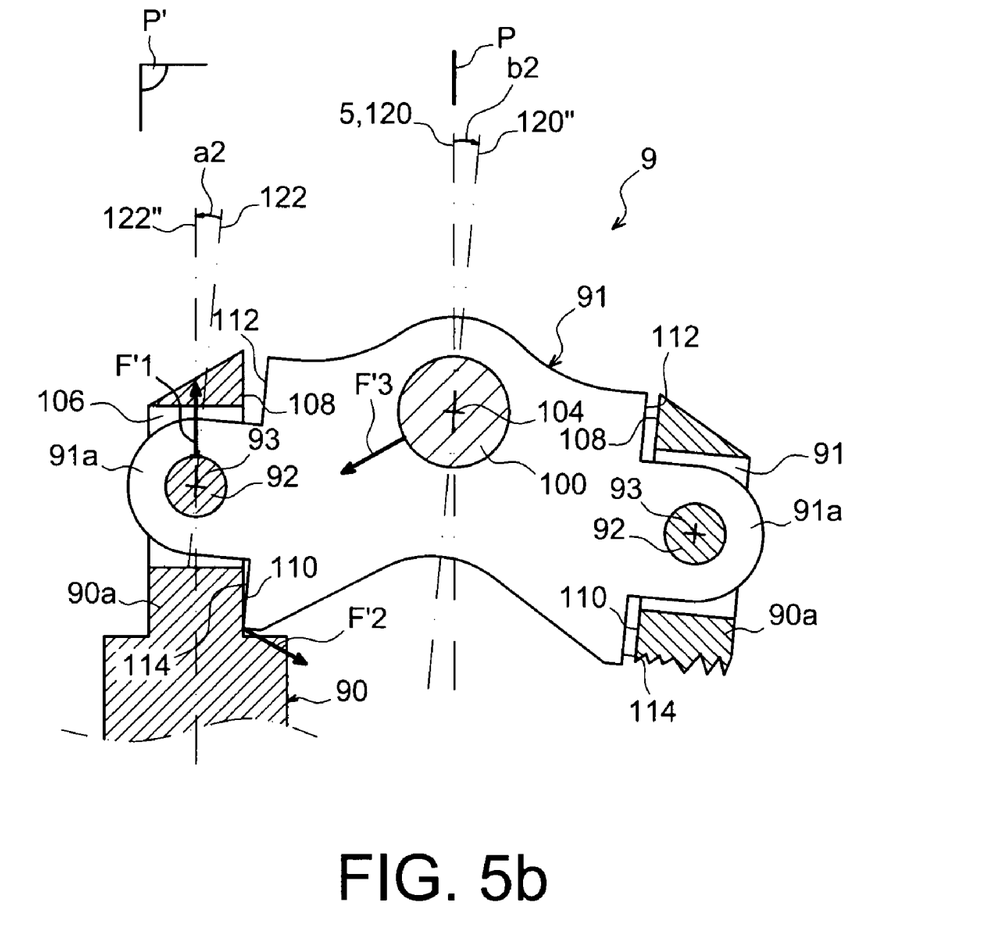
FIG. 5b shows a view which is similar to that of FIG. 4, in a configuration adopted following a failure of one of the two lateral link rods for taking up thrust forces, in reverse thrust mode.

With reference now to FIG. 5b, one can see the take-up device 9 in failure mode, encountered after failure of a link rod, which takes the form, for example, of breakage of this lateral link rod 90, or breakage of its pivot mechanism 92. The breakage occurs here with the engine operating in reverse thrust mode.

When a failure of this type occurs, the spreader bar 91, which is now only connected by a single link rod 90, pivots until the back-up link which incorporates the end-stop means is activated, by taking up the gap between the surfaces 110 and 114, and by these surfaces then coming into contact with each other.

More precisely, the non-defective link rod 90, that to the left of FIG. 5b, continues to be subjected to forces by the engine, and exerts a force F1' on the lateral end of the spreader bar 91a, which tends to cause this spreader bar to pivot along the axis 104 of the pivot mechanism 100, in a direction which is opposite to that encountered in normal thrust mode, here the clockwise direction. This pivoting movement is allowed by the relative rotation between the non-defective link rod 90 and the same spreader bar 91, along axis 93 of the pivot mechanism 92. The aforementioned movement resulting from the force F'1 of the link rod on the spreader bar continues until the back-up link, which incorporates the end-stop means, is activated through the third and fourth end-stop surfaces 110, 114 coming into contact. This contact, shown in FIG. 5b, then prevents the relative rotation from continuing in the given direction, which corresponds here to a movement of the link rod relative to the spreader bar in the anti-clockwise direction. The spreader bar in effect becomes immobilised in terms of rotation by having force exerted on it at three points, by the force F'1 from the mechanism 92 on the lateral end 91a of the spreader bar, by the force F'2 from the third end-stop surface 110 on the fourth end-stop surface 114, then by a force F'3 from the pivot mechanism of the spreader bar 100 on a central part of the latter.

Thus, in spite of the failure of one of the lateral inks 90, the spreader bar 91 remains subjected to three balanced forces shown schematically by the arrows F'1, F'2 and F'3 in FIG. 5b.

Relative rotation of the link rod 90 relative to the spreader bar 91 occurs through an angle a2 between the neutral position and the end-stop position of FIG. 5b, in which the non-defective link rod 90 is then aligned along a link rod axis 122" relative to the lateral end of the spreader bar 91a. The angle a2 defined between these two axes 122, 122" is preferably less than 5°, and in the opposite direction to the aforementioned angle a1. Consequently, the angular range of the relative rotation between the link rod 90 and the spreader bar 91 is fixed by the sum of the angles a1 and a2, therefore here preferably less than 10°. This is the same irrespective of that of the two link rods 90 involved.

The relative rotation of the spreader bar 91 relative to its fixed support component 42 occurs through an angle b2 between the neutral position and the end-stop position of FIG. 5b. In other terms, the axis of symmetry 120 of the spreader bar 91 in its neutral position is inclined at an angle b2 relative to the same axis of symmetry 120" of the spreader bar 91 in its end-stop position against the non-defective link rod. Here also it is arranged so that the angle b2 defined between these two axes 120, 120" is preferably less than 5°. Consequently, the angular range of the relative rotation between the spreader bar 91 and the fixed component 42 is fixed by the sum of the angles b1 and b2 of opposite directions therefore here preferably less than 10°.

Naturally, various modifications can be made by professionals working in this field to the pylon 4 of the turboshaft aircraft engine 2 that has just been described as a non-restrictive example only. In this way, one could in particular indicate that although the pylon 4 has been described in a suitable configuration for it to be suspended below the aircraft's wing, this pylon 4 could also be described in a different configuration enabling it to be fitted above the same wing.

The invention claimed is:

1. A device for taking up thrust forces for an aircraft engine pylon, the device comprising:
    two lateral link rods for taking up thrust forces;
    a spreader bar pivotally coupled to a fixed component of the aircraft engine pylon through a spreader bar pivot mechanism about a first axis, arranged between two lateral ends of the spreader bar on which the two lateral link rods respectively pivot, each through a link rod pivot mechanism about a second axis; and
    safety means which allow rotation of the spreader bar around the first axis of the spreader bar pivot mechanism to be restricted,
    wherein the safety means includes, associated with each of the two lateral link rods, first end-stop means provided on the link rod, as well as second end-stop means provided on the spreader bar, and
    wherein the first end-stop means and the second end-stop means are used to stop the relative rotation in the given direction of rotation once the first end-stop means and the second end-stop means have come into contact as a result of relative rotation between the spreader bar and the link rod around the second axis of the link rod pivot mechanism and in a given direction of rotation.

2. The device according to claim 1, wherein:
    the safety means also include, associated with each of the two lateral link rods, third end-stop means provided on the link rod, as well as fourth end-stop means provided on the spreader bar, and
    the third and fourth end-stop means, once they have come into contact as a result of relative rotation between the spreader bar and the link rod around the second axis of the link rod pivot mechanism and in the direction of rotation opposite that of the given direction of rotation, are used to stop the relative rotation in the opposite direction of rotation.

3. The device according to claim 2, wherein the first, second, third, and fourth end-stop means are designed to allow relative rotation between the spreader bar and the link rod through an angular range of less than about 10°.

4. The device according to claim 2 or claim 3, wherein a rear end of each link rod has a housing which receives its associated lateral end of the spreader bar, with the first and third end-stop means being respectively arranged on either side of the housing in a longitudinal direction of the link rod.

5. The device according to claim 4, wherein the link rod pivot mechanism passes through the housing as well as the associated lateral end of the spreader bar.

6. The device according to claim 2, wherein a front end of each link rod is designed to pivot on the engine.

7. The device according to claim 2, wherein the first, second, third, and fourth end-stop means take the form of end-stop surfaces.

8. A pylon for an aircraft engine wherein the pylon includes a device for taking up thrust forces according to claim 1.

9. An engine assembly for an aircraft, wherein the engine assembly includes a pylon according to claim 8 as well as an engine fixed firmly to the pylon.

10. An aircraft which includes at least one engine assembly according to claim 9.

11. The engine assembly for an aircraft according to claim 9, wherein the engine is a turbojet.

12. The device according to claim 2, wherein the first and third end-stop means take the form of end-stop surfaces.

13. The device according to claim 2, wherein the second and fourth end-stop means take the form of end-stop surfaces.

14. The device according to claim 13, wherein:
the second end-stop surface is arranged between a longitudinal axis of one of the two lateral link rods and a plane of symmetry of the spreader bar, when viewed along the first axis, and the second end stop surface faces away from the plane of symmetry of the spreader bar.

15. The device according to claim 13, wherein:
the fourth end-stop surface is arranged between a longitudinal axis of one of the two lateral link rods and a plane of symmetry of the spreader bar, when viewed along the first axis, and
the fourth end-stop surface faces away from the plane of symmetry of the spreader bar.

16. The device according to claim 12, wherein the first end-stop surfaces and the third end-stop surfaces face a plane of symmetry of the spreader bar.

17. The device according to claim 2, wherein:
a rear end of each link rod has a housing which receives its associated lateral end of the spreader bar, and
the housing takes the form of a slot.

* * * * *